(12) United States Patent
Inayama et al.

(10) Patent No.: US 6,779,541 B2
(45) Date of Patent: Aug. 24, 2004

(54) FLUID PRESSURE REGULATOR

(75) Inventors: Naoto Inayama, Kasukabe (JP); Masao Kajitani, Noda (JP)

(73) Assignee: SMC Kabushiki Kaisha, Tokyo (JP)

( * ) Notice: Subject to any disclaimer, the term of this patent is extended or adjusted under 35 U.S.C. 154(b) by 36 days.

(21) Appl. No.: 10/267,781

(22) Filed: Oct. 10, 2002

(65) Prior Publication Data

US 2003/0070710 A1 Apr. 17, 2003

(30) Foreign Application Priority Data

Oct. 12, 2001 (JP) .......................................... 2001-315760

(51) Int. Cl.$^7$ .............................................. G05D 16/20
(52) U.S. Cl. ................... 137/102; 137/487.5
(58) Field of Search ............................... 137/102, 487.5

(56) References Cited

U.S. PATENT DOCUMENTS

| | | | | |
|---|---|---|---|---|
| 4,901,758 A | * | 2/1990 | Cook et al. .............. | 137/487.5 |
| 4,951,705 A | * | 8/1990 | Carey et al. .............. | 137/487.5 |
| 5,469,877 A | * | 11/1995 | Askew ..................... | 137/487.5 |
| 6,305,401 B1 | * | 10/2001 | Uehara et al. .............. | 137/102 |
| 6,508,268 B1 | * | 1/2003 | Kouketsu .................. | 137/487.5 |
| 6,584,999 B2 | * | 7/2003 | Inayama et al. ............ | 137/102 |

FOREIGN PATENT DOCUMENTS

| | | |
|---|---|---|
| JP | 7-50418 | 5/1995 |
| JP | 2624943 | 4/1997 |

* cited by examiner

*Primary Examiner*—Gerald A. Michalsky
(74) *Attorney, Agent, or Firm*—Paul A. Guss

(57) ABSTRACT

A fluid pressure regulator has a program controller, a PID controller, a second PID controller, a drive controller, a solenoid-operated valve for supplying a fluid, a solenoid-operated valve for discharging a fluid, a diaphragm, a main valve, and a pressure sensor. Based on a desired preset value and/or a desired control program inputted from an external source, the fluid pressure regulator regulates the pressure or flow rate of the fluid discharged from a discharge port of the main valve. A detecting mechanism is combined with a controlled object for supplying a controlled variable in the controlled object to the second PID controller through a feedback loop.

4 Claims, 6 Drawing Sheets

FLUID PRESSURE REGULATOR

BACKGROUND OF THE INVENTION

1. Field of the Invention

The present invention relates to a fluid pressure regulator for regulating the pressure or flow rate of a fluid.

2. Description of the Related Art

Heretofore, controlling the pressure or flow rate of a fluid with a fluid pressure regulator has widely been known.

For example, Japanese Patent Publication No. 7-50418 discloses a pneumatic pressure regulator which operates as follows: For regulating the pressure of a fluid discharged from a main valve, the pressure of the discharged fluid is detected by a pressure sensor, and a detected signal from the pressure sensor is compared with a preset value by a controller. The controller outputs a pulse signal depending on the comparison result to a two-port solenoid-operated valve for supplying the fluid or a two-port solenoid-operated valve for discharging the fluid. The pneumatic pressure regulator increases or reduces a pilot pressure depending on pneumatic pressure pulses supplied from either one of the solenoid-operated valves to open or close a fluid supply valve body coupled to a diaphragm chamber (pilot chamber) for thereby regulating the pressure of the fluid discharged from a main valve to a preset pressure.

FIG. 5 of the accompanying drawings shows a conventional fluid pressure regulator 1 having a drive controller 5 which is supplied with a desired preset value or a desired control program through an external controller 2. The drive controller 5 compares the desired preset value or the desired control program with a detected signal from a sensor 10. The drive controller 5 then outputs a drive signal, which has been PID-converted (proportional plus integral plus derivative) based on the comparison result, to a solenoid-operated valve 6 for supplying the fluid and/or a solenoid-operated valve 7 for discharging the fluid. In response to the drive signal, the solenoid-operated valve 6 and/or solenoid-operated valve 7 is opened or closed to control the supply of the fluid or the discharge of the fluid by a pilot valve 8. The pilot valve 8 then operates a fluid supply valve and/or a fluid discharge valve of a main valve 9 for thereby regulating the pressure or flow rate of the fluid supplied from a fluid pressure source (not shown) to a controlled object 4.

As shown in FIG. 6 of the accompanying drawings, the external controller 2 stores different control programs as patterns P1, P2, P3 for controlling the fluid pressure with respect to time. The external controller 2 outputs a command for selectively executing the stored control programs. The external controller 2 comprises a general sequencer or personal computer. The external controller 2 has various functions including control, decision, processing, arithmetic, and storage functions.

The controlled object 4 may be a device for controlling an internal pressure or a fluid quantity in a fluid tank, or a device for controlling a vacuum within a vacuum chamber of a semiconductor control apparatus.

A detecting mechanism 3, which may be added when necessary, comprises some of various sensors and measuring units selected depending on the accuracy of a control range for a controlled variable required by the controlled object 4.

The external controller 2 and the detecting mechanism 3 are installed by the user.

In order to input the preset value or the control program to the controller of the pneumatic pressure regulator disclosed in the Japanese Patent Publication No. 7-50418 or the drive controller 5 of the fluid pressure regulator 1 shown in FIG. 5, it is necessary for the user to select a general sequencer or personal computer for use as the external controller 2 and install the selected sequencer or personal computer with a program having various desired functions. Therefore, the resultant system is highly expensive.

SUMMARY OF THE INVENTION

It is a general object of the present invention to provide a fluid pressure regulator which is low in cost and which is a space saver.

According to the present invention, a fluid pressure regulator is low in cost and is a space saver because there is no need to install an external controller for the fluid pressure regulator.

The fluid pressure regulator has a PID controller for comparing, processing, and calculating a control signal inputted from a second PID controller based on a detected signal from a sensor, and converting the resultant signal into a PID signal. The PID controller can thus output a highly accurate control signal to a drive controller for actuating solenoid-operated valves.

A controlled variable in a controlled object which is associated with the fluid pressure regulator is detected and supplied to the second PID controller through a feedback loop. Consequently, the controlled variable in the controlled object can be adjusted with high accuracy.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
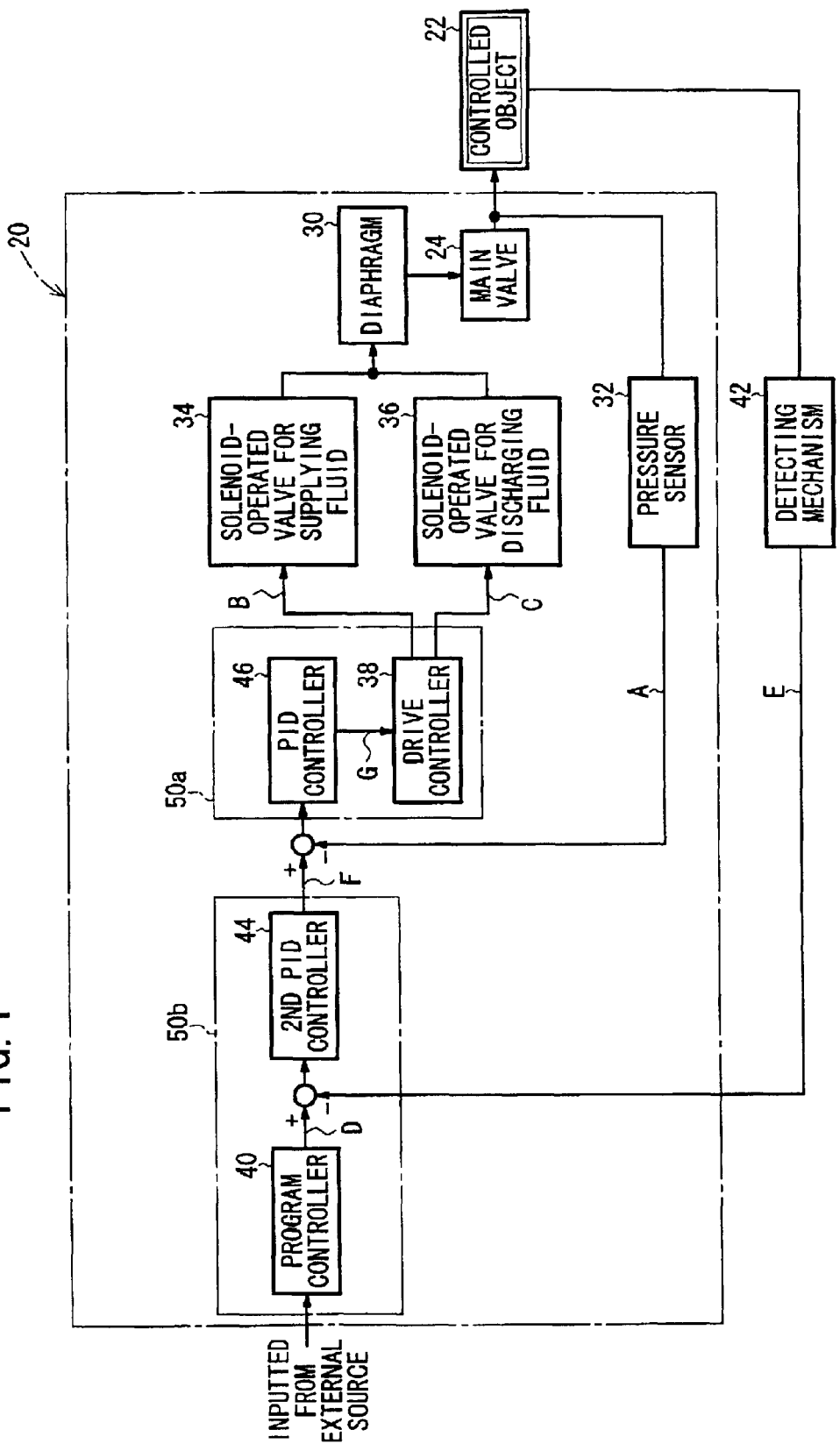
FIG. 1 is a block diagram of a control system incorporating a fluid pressure regulator according to the present invention.
Figure 2:
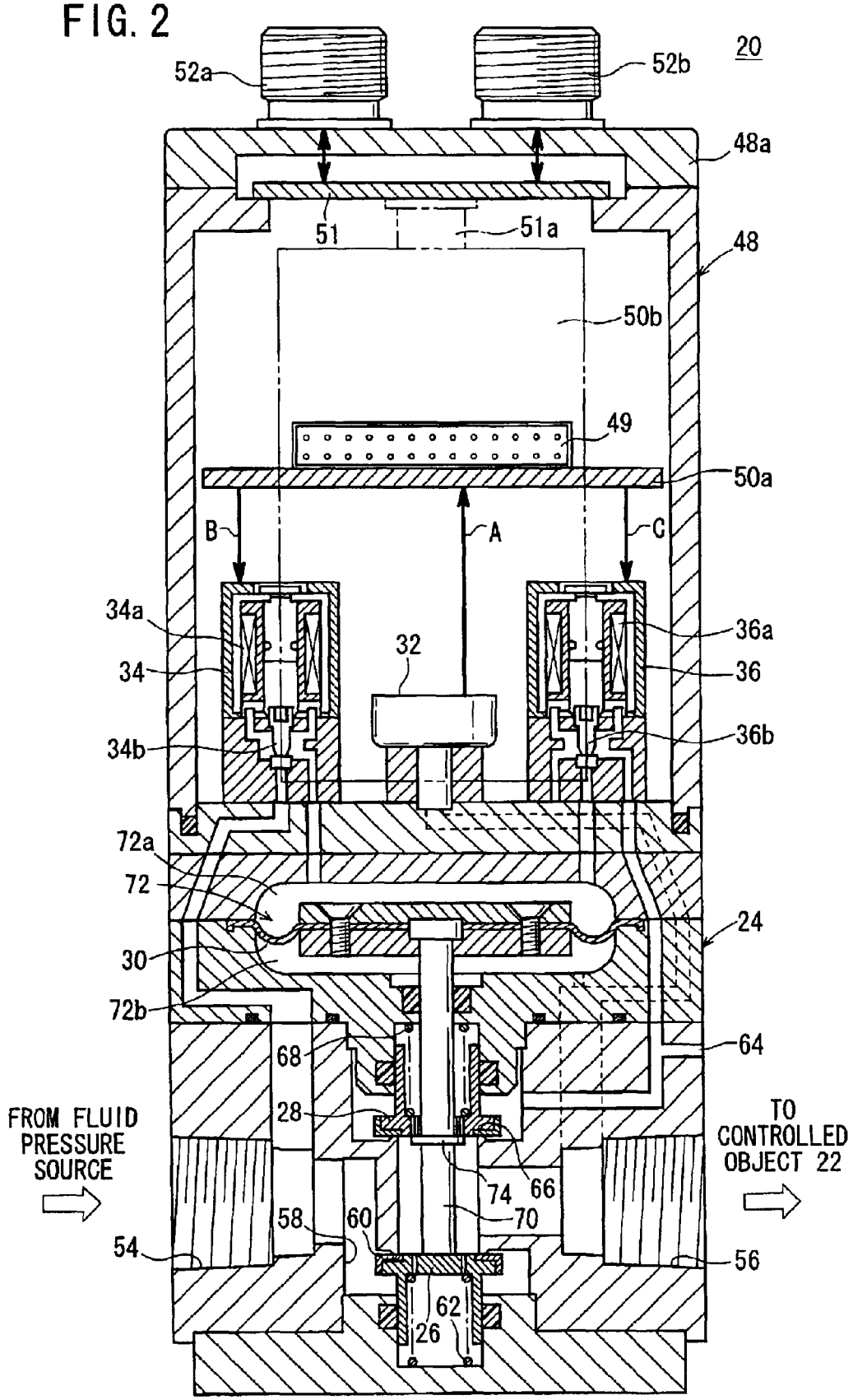
FIG. 2 is a vertical cross-sectional view of the fluid pressure regulator.

As shown in FIGS. 1 and 2, a fluid pressure regulator 20 according to the present invention has a main valve 24 for regulating the pressure or flow rate of a fluid to be discharged into a controlled object 22 such as a fluid pressure device, a diaphragm 30 for operating a fluid supply valve body 26 and a fluid discharge valve body 28 of the main valve 24, a pressure sensor 32 for detecting the pressure of the fluid discharged from the main valve 24 and outputting a detected signal (a first detected signal) A representative of the detected pressure, and a solenoid-operated valve 34 and a solenoid-operated valve 36 for controlling the supply of the fluid and the discharge of the fluid, respectively, by the diaphragm 30.

The fluid pressure regulator 20 also has a drive controller 38 for outputting drive signals B, C respectively, to the solenoid-operated valves 34, 36, a program controller 40 for storing a desired preset value and/or a desired control program which is entered from an external source, and outputting a control signal D based on the preset value and/or the control program, a second PID controller 44 for outputting a PID (proportional plus integral plus derivative) conversion signal (a second PID conversion signal) F converted based on the control signal D and a detected signal (a second detects signal) E outputted from a detecting mechanism 42 which detects a controlled variable in the controlled object 22, and a PID controller (a first PID controller) 46 for outputting a PID conversion signal (a first PID conversion signal) G converted based on the PID conversion signal F and the detected signal A.

The fluid pressure regulator 20 includes a case assembly 48 whose components are integrally joined together in covering relation to the main valve 24. The case assembly 48 includes a case cover 48a closing an opening in one end of the case assembly 48. The case assembly 48 houses integrally therein a first board (a control board or controller) 50a which supports the drive controller 38 and the PID controller 46, and a second board (a program control board or program controller) 50b which supports the program controller 40 and the second PID controller 44. The first board 50a and the second board 50b are electrically connected to each other by a connector 49 or a cable (not shown).

The case assembly 48 has a pair of connectors 52a, 52b for connection to an external power supply and input and output devices. The connector 52a has a DC power supply terminal of +24 [V] or +12 [V], a terminal of 0 [V], a plurality of communication terminals for inputting signals from an external source, and a ground terminal. The connector 52b has a plurality of terminals for inputting the detected signal E from the detecting mechanism 42, a pair of terminals for inputting signals for fully opening and closing the main valve 24, a terminal for inputting a manual start signal for the fluid pressure regulator 20, and a ground terminal.

The connectors 52a, 52b are electrically connected to the second board 50b through an input/output interface 51 and a cable assembly 51a which are disposed in the case assembly 48. The input/output interface 51 has a voltage conversion function for converting a DC voltage of +24 [V] into a DC voltage of +5 [V] and an A/D conversion function for converting the detected signal E applied as an analog signal into a digital signal.

The main valve 24 has a fluid supply port (also referred to as a supply port) 54 connected to a non-illustrated fluid pressure source and a discharge port 56 connected to the controlled object 22. The fluid supply port 54 and the discharge port 56 are connected to each other by a passage 58 which accommodates therein the fluid supply valve body 26 for opening and closing a fluid supply opening 60. The fluid supply valve body 26 is normally biased in a direction to close the fluid supply opening 60 under the resiliency of a spring 62.

The main valve 24 also has a fluid discharge port 64 which is connected to the discharge port 56 by a fluid discharge opening 66 accommodating therein the fluid discharge valve body 28 for opening and closing the fluid discharge opening 66. The fluid discharge valve body 28 is normally biased in a direction to close the fluid discharge opening 66 under the resiliency of a spring 68. A stem 70 is disposed in the main valve 24 and has an end held against the fluid supply valve body 26 and the other end integrally joined to the diaphragm 30. A retaining ring 74 is mounted on the stem 70 for opening the fluid discharge valve body 28.

The diaphragm 30 defines a first diaphragm chamber 72a on one side thereof and a second diaphragm chamber 72b on the other side thereof. The first diaphragm chamber 72a and the second diaphragm chamber 72b jointly make up a diaphragm chamber (also referred to as a pilot chamber) 72. The first diaphragm chamber 72a communicates with the solenoid-operated valves 34, 36. The second diaphragm chamber 72b communicates with the discharge port 56.

The solenoid-operated valve 34 comprises an electromagnetic coil 34a for being supplied with a drive signal B from the drive controller 38 and a valve body 34b for increasing or reducing the supplied amount of the fluid under pressure between the fluid supply port 54 and the first diaphragm chamber 72a.

The solenoid-operated valve 36 comprises an electromagnetic coil 36a for being supplied with a drive signal C from the drive controller 38 and a valve body 36b for increasing or reducing the discharged amount of the fluid under pressure from the first diaphragm chamber 72a.

The pressure sensor 32 detects the fluid pressure in the second diaphragm chamber 72b, i.e., the fluid pressure discharged from the main valve 24, and outputs the detected signal A, which is an electric signal converted from the detected fluid pressure, to the PID controller 46.

The detecting mechanism 42 detects or measures the controlled variable in the controlled object 22, and outputs the detected signal E, which is an electric signal converted from the detected or measured controlled variable, to the second PID controller 44. The detecting mechanism 42 comprises a pressure sensor, a position sensor, a flow meter, or the like selected depending on the accuracy of a control range for the controlled variable required by the controlled object 22.

Figure 6:
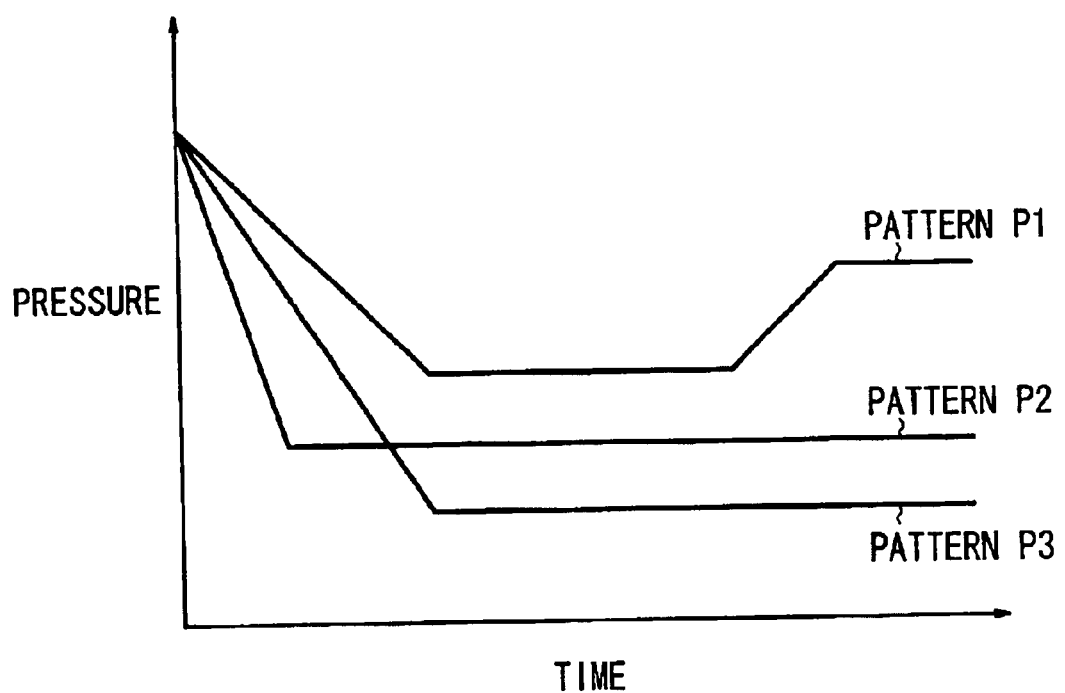
FIG. 6 is a graph showing control programs as different patterns for the conventional fluid pressure regulator.

The program controller 40 includes a storage mechanism for being supplied, from an external source, with and storing a desired preset value or desired control programs (see FIG. 6) for controlling the controlled variable with respect to time. The program controller 40 also has various functions including control, decision, processing, and arithmetic functions. When the desired preset value is inputted or one of the desired control programs is selected, the program controller 40 outputs the control signal based on the inputted preset value or the selected control program to the second PID controller 44.

The second PID controller 44 has a function to compare the control signal D inputted from the program controller 40 and the detected signal E inputted from the detecting mechanism 42 with each other, process and calculate the comparison result, and convert the resultant signal into the PID conversion signal F. The second PID controller 44 outputs the PID conversion signal F to the PID controller 46.

The PID controller 46 has a function to compare the PID conversion signal F inputted from the second PID controller 44 and the detected signal A inputted from the pressures sensor 32 with each other, process and calculate the comparison result, and convert the resultant signal into the PID conversion signal G. The PID controller 46 outputs the PID conversion signal G to the drive controller 38.

The drive controller 38 has a function to convert the PID conversion signal G inputted from the PID controller 46 into the drive signals B, C for actuating the solenoid-operated valves 34, 36. The drive controller 38 then outputs the drive signals B, C to the solenoid-operated valve 34 and/or the solenoid-operated valve 36.

The fluid pressure regulator 20 according to the present invention is basically constructed as described above. Operation of the fluid pressure regulator 20 will be described below.

First, the program controller 40 is supplied, from an external source, with a desired preset value or desired control programs (see FIG. 6) for controlling the controlled variable with respect to time. Based on the preset value or a selected one of the control program, the program controller 40 outputs the control signal D. The control signal D is converted by the second PID controller 44, the PID controller 46, and the drive controller 38 into the drive signal B, which is applied to the electromagnetic coil 34a for opening the valve body 34b of the solenoid-operated valve 34.

The valve body 34b is opened to bring the fluid supply port 54 into communication with the first diaphragm chamber 72a. When the fluid pressure in the first diaphragm chamber 72a becomes higher than the fluid pressure in the second diaphragm chamber 72b, the diaphragm 30 is displaced into the second diaphragm chamber 72b (downwardly in FIG. 2). The stem 70 moves in unison with the diaphragm 30, opening the fluid supply valve body 26 against the bias of the spring 62. The fluid under pressure is supplied from the fluid supply port 54 through the passage 58 and the fluid supply opening 60 to the discharge port 56. Therefore, the fluid under pressure is supplied from the fluid pressure source to the controlled object 22.

The pressure of the fluid discharged from the discharge port 56 is detected by the pressure sensor 32, which supplies the detected signal A, which is an electric signal converted from the detected pressure, to the PID controller 46 through a feedback loop. When the fluid pressure in the discharge port 56 reaches a desired value, the drive controller 38 outputs the drive signal B to the electromagnetic coil 34a to close the valve body 34b of the solenoid-operated valve 34 based on the PID conversion signal G from the PID controller 46, and also outputs the drive signal C to the electromagnetic coil 34b to open the valve body 36b of the solenoid-operated valve 36.

The solenoid-operated valve 34 closes the valve body 34b, and the solenoid-operated valve 36 displaces the valve body 36b to bring the first diaphragm chamber 72a into communication with the fluid discharge port 64, thus discharging the fluid under pressure from the first diaphragm chamber 72a into the atmosphere. When the fluid pressure in the first diaphragm chamber 72a becomes lower than the fluid pressure in the second diaphragm chamber 72b, the diaphragm 30 is displaced into the first diaphragm chamber 72a (upwardly in FIG. 2). The stem 70 moves in unison with the diaphragm 30, and is displaced under the bias of the spring 62, closing the fluid supply valve body 26.

When the fluid pressure in the first diaphragm chamber 72a becomes lower than the fluid pressure in the second diaphragm chamber 72b, the diaphragm 30 is further displaced into the first diaphragm chamber 72a. The stem 70 disengages from the fluid supply valve body 26, and is displaced against the bias of the spring 68, causing the retaining ring 74 to open the fluid discharge valve body 28. The fluid under pressure in the controlled object 22 then flows from the discharge port 56 through the fluid discharge opening 66 and the fluid discharge port 64 into the atmosphere.

If the fluid pressure discharged from the discharge port 56 becomes lower than a desired value, then in order to open the valve body 34b of the solenoid-operated valve 34, the drive controller 38 applies the drive signal B to the electromagnetic coil 34a of the solenoid-operated valve 34, which displaces the valve body 34b. The fluid supply valve body 26 is now opened to supply the fluid under pressure from the fluid supply port 54 through the passage 58 and the fluid supply opening 60 again to the discharge port 56. The fluid under pressure is now supplied from the fluid pressure source to the controlled object 22.

With the fluid pressure regulator 20, based on the detected signal A from the pressure sensor 32, the supply and discharge of the fluid by the solenoid-operated valve 34 and/or the solenoid-operated valve 36 is controlled to regulate the fluid pressure in the first diaphragm chamber 72a for thereby adjusting the fluid pressure discharged from the discharge port 56 to a desired level or maintain the fluid pressure discharged from the discharge port 56 in a desired control pattern. As a result, the fluid pressure in the controlled object 22 is regulated to a desired value or maintained in a desired control pattern.

In the present embodiment, the controlled object 22 is combined with the detecting mechanism 42, which detects or measures the controlled variable in the controlled object 22, and the detected signal, which is an electric signal converted from the detected or measured controlled variable, to the second PID controller 44 through the feedback loop. The fluid pressure in the controlled object 22 is accurately regulated to the desired value or maintained in the desired control pattern by the PID control signal F from the second PID controller 44 based on the detected signal E.

In the present embodiment, the fluid pressure regulator 20 regulates the fluid pressure supplied from the fluid pressure source. However, the fluid pressure regulator 20 may be connected to a negative pressure source for the controlled object 22 to draw a fluid under negative pressure.

Applications of fluid control using the fluid pressure regulator 20 will be described below.

Figure 3:
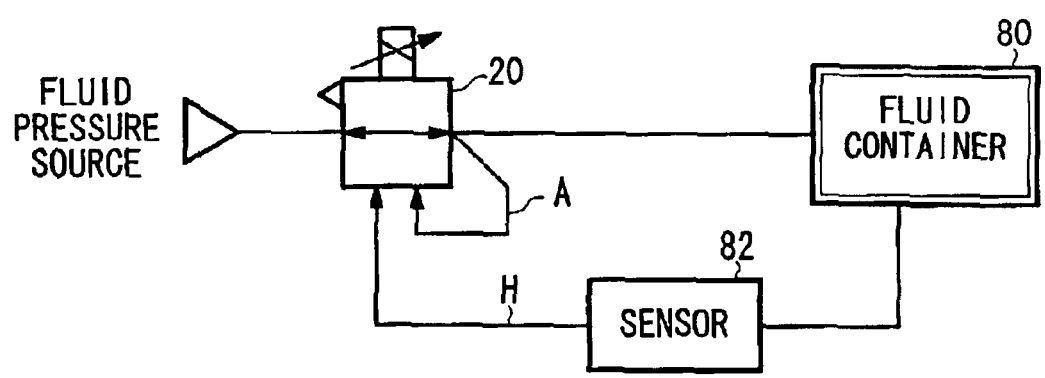
FIG. 3 is a block diagram of a control system for a fluid container which incorporates the fluid pressure regulator according to a first application.

FIG. 3 shows in block form a control system for a fluid container 80 which incorporates the fluid pressure regulator 20 according to a first application.

The fluid container 80 serves to store a viscous liquid in a desired quantity for a desired period of time. When the fluid pressure regulator 20 is actuated, the main valve 24 is operated according to a desired control program to supply the viscous liquid from the fluid pressure source to the fluid container 80 to adjust the amount of the liquid in the fluid container 80. In FIG. 3, the reference character A represents the detected signal outputted from the pressure sensor 32.

A sensor 82 which is associated with the fluid container 80 comprises a liquid amount meter for detecting the amount of the liquid in the fluid container 80 or a position sensor for detecting the level of the liquid in the fluid container 80. The sensor 80 detects the amount of the liquid in the fluid container 80 or the level of the liquid in the fluid container 80, and outputs a detected signal H, which is an electric signal converted from the detected amount or level, to the second PID controller 44 in the fluid pressure regulator 20.

Figure 4:
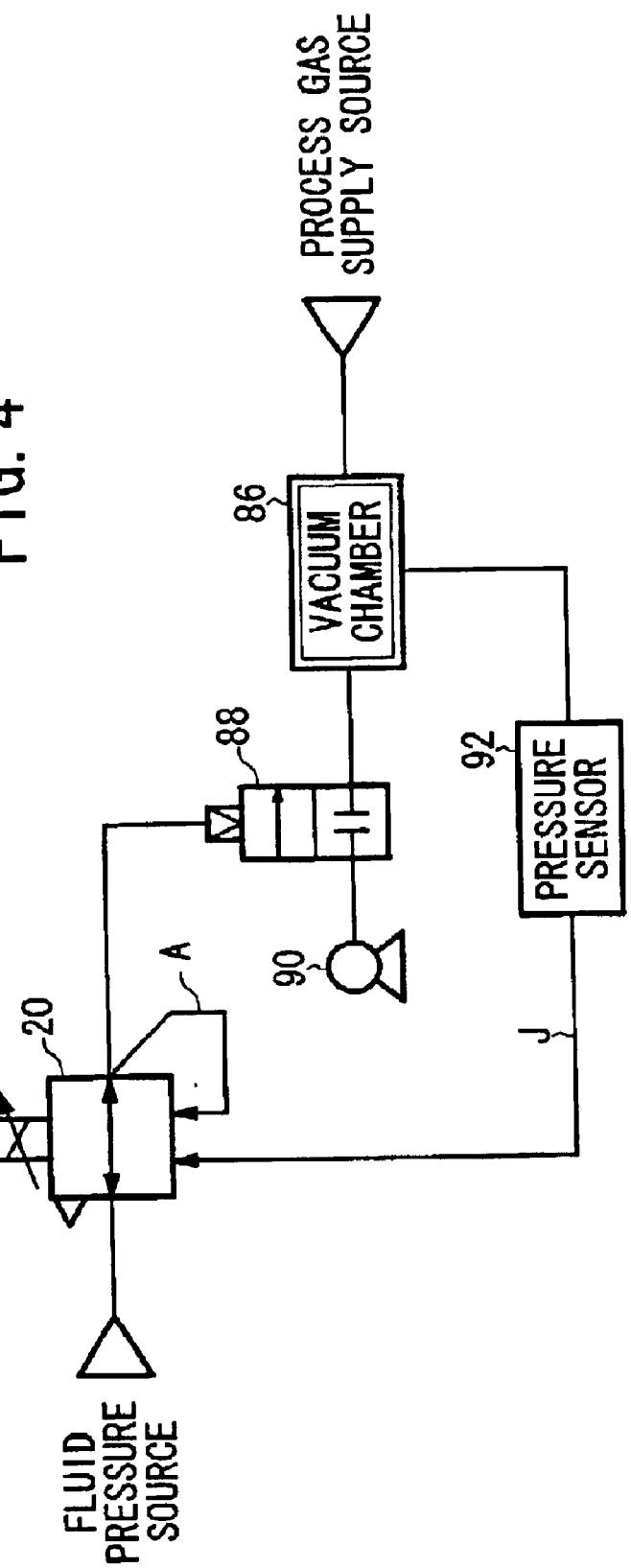
FIG. 4 is a block diagram of a control system for a fluid container which incorporates the fluid pressure regulator according to a second application.

FIG. 4 shows in block form a control system for a vacuum chamber 86 which incorporates the fluid pressure regulator 20 according to a second application.

The vacuum chamber 86 is used in a semiconductor fabrication process, and a process gas in the vacuum chamber 86 is controlled under a desired vacuum pressure.

A two-way valve 88 comprises a two-way valve for use with a medium- or high-vacuum pressure and has an orifice diameter of 160 mm. Under the control of the two-way valve 88, a vacuum pump 90 draws the process gas from the vacuum chamber 86. When the fluid pressure regulator 20 is actuated, the main valve 24 is operated according to a desired control program to supply a fluid from the fluid pressure source to the two-way valve 88 for thereby adjusting the opening of the valve body in the two-way valve 88. In FIG. 4, the reference character A represents a detected signal outputted from the pressure sensor 32. Depending on the opening of the valve body in the two-way valve 88, the amount of the process gas drawn from the vacuum chamber 86 by the vacuum pump 90 is adjusted to regulate the vacuum pressure of the process gas in the vacuum chamber 86.

A pressure sensor 92 which is associated with the vacuum chamber 86 comprises a sensor for detecting the vacuum pressure of the process gas in the vacuum chamber 86. The pressure sensor 92 detects the vacuum pressure of the process gas in the vacuum chamber 86, and outputs a detected signal J, which is an electric signal converted from the detected vacuum pressure, to the second PID controller 44 in the fluid pressure regulator 20.

Figure 5:
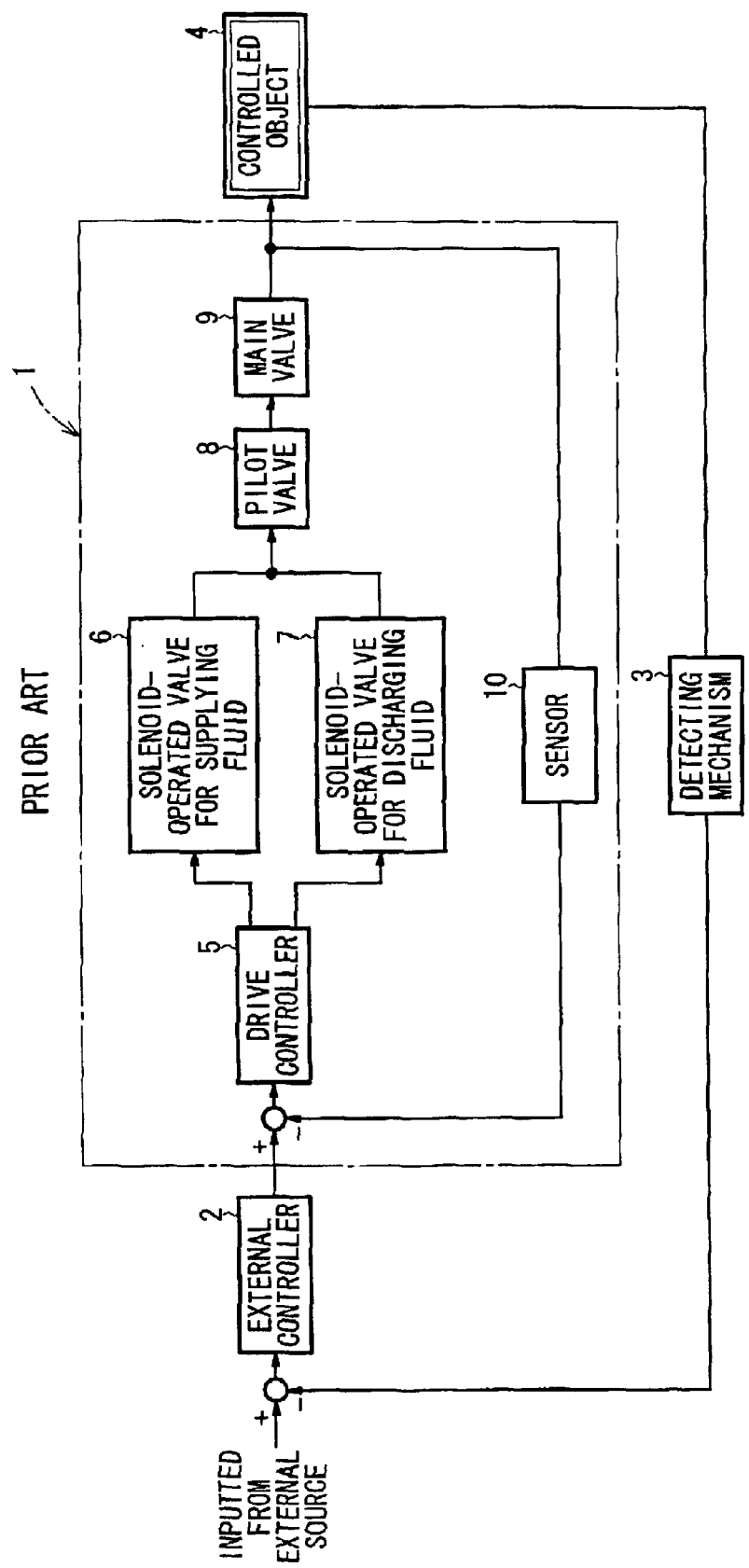
FIG. 5 is a block diagram of a control system incorporating a conventional fluid pressure regulator.

According to the present invention, since the fluid pressure regulator 20 is not required to be combined with an external controller such as the external controller 2 of the conventional fluid pressure regulator 1 shown in FIG. 5. Therefore, the fluid pressure regulator 20 is low in cost and is a space saver.

The PID controller 46 compares, processes, and calculates the PID conversion signal F inputted from the second PID controller 44 based on the detected signal A inputted from the pressure sensor 32, and converts the resultant signal into a PID signal. The PID controller 46 can thus output the PID conversion signal G which is highly accurate to the drive controller 38.

The fluid pressure regulator 20 which is used in the first and second applications described above detects and supplies the amount of the liquid in the fluid container 80 or the vacuum pressure of the process gas in the vacuum chamber 86 through the feedback loop. Therefore, the fluid pressure regulator 20 can regulate, with high accuracy, the amount of the liquid in the fluid container 80 or the vacuum pressure of the process gas in the vacuum chamber 86.

Although a certain preferred embodiment of the present invention has been shown and described in detail, it should be understood that various changes and modifications may be made therein without departing from the scope of the appended claims.

What is claimed is:

1. A fluid pressure regulator comprising:
   a main valve having a fluid supply valve body and a fluid discharge valve body for regulating the pressure or flow rate of a fluid;
   a diaphragm for operating said fluid supply valve body and said fluid discharge valve body;
   a sensor for detecting the pressure or flow rate of the fluid discharged from said main valve and outputting a detected signal representing the detected pressure or flow rate;
   a drive controller for outputting a drive signal based on a control signal inputted thereto;
   a first solenoid-operated valve and a second solenoid-operated valve, said first and second solenoid-operated valves being openable and closable by said drive signal for controlling the supply of the fluid and the discharge of the fluid by said diaphragm;
   a program controller for storing a preset value and/or a control program inputted from an external source and outputting a control signal based on said preset value and/or said control program;
   a first PID controller for outputting, to said drive controller, a PID conversion signal converted based on the control signal outputted from said program controller and the detected signal outputted from said sensor;
   a detecting mechanism for detecting a controlled variable in a controlled object and outputting a second detected signal representative of the detected controlled variable; and
   a second PID controller for outputting to said first PID controller, a PID conversion signal converted based on the second detected signal outputted from said detecting mechanism and the control signal outputted from said program controller.

2. A fluid pressure regulator for increasing and reducing a fluid supplied to and discharged from a diaphragm based on a fluid supplied to and discharged from solenoid-operated valves which are energized and de-energized, for thereby regulating the pressure or flow rate of a fluid discharged from a main valve, comprising:
   a case;
   a sensor for detecting the pressure or flow rate of the fluid discharged from the main valve;
   a first PID controller, said solenoid-operated valves and said sensor being electrically connected to said first PID controller;
   a program controller electrically connected to said controller for being supplied with and storing a preset value and/or a control program; and
   a detecting mechanism for detecting a controlled variable in a controlled object connected to a discharge port of said main valve, said detecting mechanism being electrically connected to said program controller and to a second PID controller,
   said second PID controller outputting to said first PID controller, a PID conversion signal converted based on a signal outputted from said detecting mechanism and a control signal outputted from said program controller,
   said first PID controller, said second PID controller and said program controller being integrally provided in said case.

3. A fluid pressure regulator according to claim 2, further comprising a first board and a second board which are disposed in said case and electrically connected to each other, said controller and said program controller being supported on said first board and said second board.

4. A fluid pressure regulator according to claim 2, wherein said case has external connection terminals for supplying said preset value and/or said control program to said program controller, said external connection terminals being electrically connected to said program controller.

* * * * *